Patented Feb. 25, 1936

2,032,159

UNITED STATES PATENT OFFICE 2,032,159

HIGHLY BRANCHED, LONG CHAIN ORGANIC ACIDS

Frank C. Whitmore, State College, Pa., August H. Homeyer, St. Louis, Mo., and David M. Jones, Forty Fort, and Walter R. Trent, State College, Pa., assignors to Mallinckrodt Chemical Works, St. Louis, Mo., a corporation of Missouri No Drawing. Application April 17, 1933, Serial No. 666,513

4 Claims. (Cl. 260—112)

This invention relates to highly branched, long chain organic acids, and with regard to certain more specific features, to acids corresponding to the type formula:

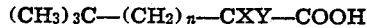

wherein $n$ is equal to or greater than 2, X is hydrogen or an alkyl substituent, and Y is hydrogen or a carboxy substituent.

Among the several objects of the invention may be noted the provision of an organic acid corresponding to the type formula given, which, more particularly, includes in its structure at least one carbon atom which is linked to four other carbon atoms (hereinafter referred to as a "neopentyl" arrangement). Other objects will be in part obvious and in part pointed out hereinafter.

The invention accordingly comprises the elements and combinations of elements, and features of composition, which will be exemplified in the products hereinafter described, and the scope of the application of which will be indicated in the following claims.

It has recently been determined that acids containing a large number of carbon atoms, particularly when such atoms are in a highly branched formation, exhibit a bactericidal effect to a remarkable degree. Such acids, for example, containing a relatively large number of carbon atoms are valuable in the treatment of bacteria leprae, the cause of leprosy. It is the purpose of the present invention to provide a series of such acids wherein the branching is carried to a considerable extent by means of the neopentyl arrangement, and which are therefore possessed of the optimum bactericidal effect obtainable. Such neopentyl-containing acids have not heretofore been prepared because of the difficulty of obtaining a readily reactible neopentyl-including compound for combination into the acid. However, in view of the invention of the present inventors, as set forth in their copending application, Serial No. 666,510, filed April 17, 1933, and the continuation-in-part application thereof, Serial No. 36,132 filed August 14, 1935, it is now possible to prepare intermediate neopentyl-containing materials such as 3,3-dimethyl-1-bromobutane and 4,4-dimethyl-1-bromopentane in sufficient quantities and with sufficient facility to render the preparation of the desired acids from these intermediate compounds quite feasible.

In the present application, by way of example, the preparation of the following acids coming within the type formula will be described:

1. 4,4-dimethyl-1-carboxypentane.
2. 5,5-dimethyl-1-carboxyhexane.
3. 5,5-dimethyl-1,1-dicarboxyhexane.
4. 6,6-dimethyl-3-carboxyheptane.
5. 6,6-dimethyl-3,3-dicarboxyheptane.
6. 7,7-dimethyl-3-carboxyoctane.
7. 7,7-dimethyl-3,3-dicarboxyoctane.
8. 2,2,10,10-tetramethyl-6-carboxyundecane.
9. 2,2,10,10 - tetramethyl - 6,6 - dicarboxyundecane.

EXAMPLES

1. 4,4-dimethyl-1-carboxypentane

This substance is prepared by allowing potassium cyanide to react upon 4,4-dimethyl-1-bromopentane (prepared as in said copending application, Serial No. 36,132) to form a nitrile, in accordance with the reaction:

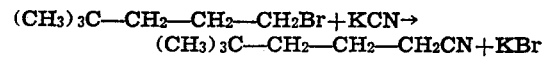

and then hydrolizing the resulting nitrile according to the reaction:

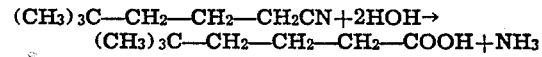

For example, 35.8 grams of 4,4-dimethyl-1-bromopentane (boiling at 68° C. under 35 mm. pressure) were dissolved in 150 cc. of 95% ethyl alcohol. To this were added 16.3 grams of solid potassium cyanide. The mixture was refluxed on the steam bath for twelve hours with occasional shaking. At the end of twelve hours, no further potassium bromide seemed to be separating, so the mixture was cooled to room temperature and 25 grams of solid potassium hydroxide were added. The mixture was then again refluxed for twelve hours on the steam bath, and then evaporated to dryness. The residue was dissolved in the minimum amount of hot water, and the solution was then acidified with concentrated hydrochloric acid. The layers were allowed to separate, and the upper layer drawn off. The lower, watery layer was extracted with three 100 cc. portions of ether, and the ether portions then evaporated and the residue added to the upper layer. The product, which was a solid at ordinary temperatures, was then fractionated. The fractionated acid product is a solid crystalline mass, melting at about 38° C., and boiling at about 130° C. under 20 mm. pressure.

2. *5,5-dimethyl-1-carboxyhexane, and*
3. *5,5-dimethyl-1,1-dicarboxyhexane*

These acids are prepared in a somewhat different manner than the nitrile-hydrolysis of the first example. The preparation here first involves the condensation of 4,4-dimethyl-1-bromopentane with diethyl malonate to form the diethyl ester of 5,5-dimethyl-1,1-dicarboxyhexane, according to the reaction:

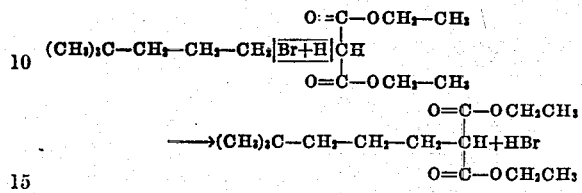

then hydrolyzing the diethyl ester to form the dibasic acid product 5,5-dimethyl-1,1-dicarboxyhexane according to the reaction:

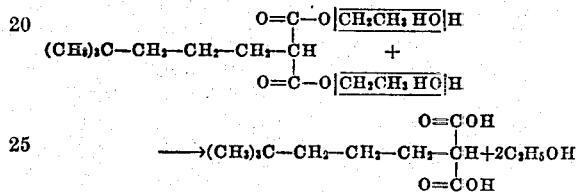

and finally removing a carbon dioxide from the dibasic acid to yield the product 5,5-dimethyl-1-carboxyhexane, according to the reaction:

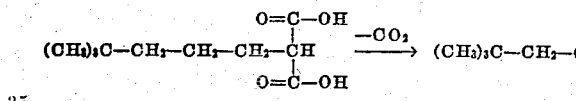 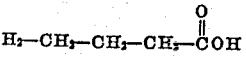

For example, 11.5 grams of metallic sodium are dissolved in absolute ethyl alcohol which had been distilled from sodium. The solution is then cooled to about 40° C., and 81 grams of diethyl malonate are added. Then 90 grams of 4,4-dimethyl-1-bromopentane (boiling at 68° C. under 35 mm. pressure) are added. A mechanical stirrer and a reflux condenser are fitted to the flask and the mixture is then heated, on a steam bath, to refluxing temperature, with stirring, and held there until a sample is no longer alkaline to litmus paper. The reaction mixture is protected from moisture and the air. When the liquid is no longer alkaline, and no more sodium bromide separates, the condenser is set for downward distillation and the alcohol is distilled off.

The residue is then cooled, and dissolved in about 200 cc. of water; the upper layer is separated, and fractionated through a suitable column. The diethyl ester product, obtained in a yield of about 77 grams, boiled at about 125° C. under 2 to 3 mm. pressure, and had a $n_D^{20}$ value of about 1.4281 to 1.4288.

Of the ester thus obtained, 38.7 grams were refluxed with a solution of 56.5 grams of potassium hydroxide in 125 cc. of water for three hours. At the end of that time, the solution was homogeneous, and contained the dibasic acid. To proceed to the monobasic acid, the solution was allowed to cool, and was made acidic with hydrochloric acid and again cooled. The upper layer was allowed to separate and was drawn off. The upper layer was then refluxed with a solution of 40 grams of potassium hydroxide in 100 cc. of water for five hours. The mixture was then again acidified, the oily upper layer was withdrawn, and the water layer was extracted with three 100 cc. portions of ether, which ether was then evaporated and the residue added to the oily layer. The combined oily layer weighed 30 grams. This was shaken with a few grains of calcium chloride to remove the water, and then heated in a flask attached to a reflux column for about three hours at about 180° C. The resulting liquid was fractionated, and the product monobasic acid was obtained. It was a colorless liquid at ordinary temperatures, boiling at about 145° C. under 20 mm. pressure, and freezing at about 13° C.

4. *6,6-dimethyl-3-carboxyheptane,* and
5. *6,6-dimethyl-3,3-dicarboxyheptane*

These substances are prepared by a synthesis like that given in connection with Examples 2 and 3, but using diethyl ethylmalonate in place of the diethyl malonate, and 3,3-dimethyl-1-bromobutane in place of the 4,4-dimethyl-1-bromopentane.

6. *7,7-dimethyl-3-carboxyoctane,* and
7. *7,7-dimethyl-3,3-dicarboxyoctane*

These substances are likewise prepared by a synthesis like that given in connection with Examples 2 and 3, but using diethyl ethylmalonate in place of the diethyl malonate, retaining, however, the use of the 4,4-dimethyl-1-bromopentane.

8. *2,2,10,10-tetramethyl-6-carboxy undecane,* and
9. *2,2,10,10-tetramethyl-6,6-dicarboxy undecane*

These compounds are particularly interesting, as containing two neopentyl arrangements at opposite ends of the chain. They are prepared in a manner similar to the above, considering the diethyl ester of the 5,5-dimethyl-1,1-dicarboxyhexane intermediate of Examples 2 and 3 as the starting point. This intermediate is condensed with additional 4,4-dimethyl-1-bromopentane according to the following reaction:

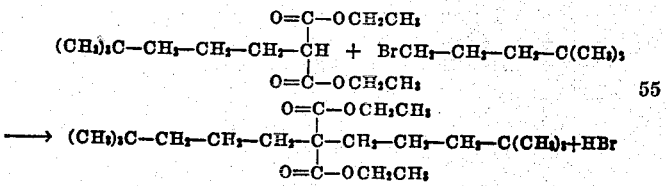

which ester is then hydrolized to the dibasic and monobasic acids in the manner of Examples 2 and 3. The preparation of the ester will be described in detail, but the hydrolysis of the ester, being similar to that of Examples 2 and 3, will not be repeated.

For example, 2.6 grams of metallic sodium were dissolved in 100 cc. of absolute ethyl alcohol which had been refluxed wtih sodium and then redistilled. This solution of sodium ethylate was then cooled to about 40° C., and 37.5 grams of the diethyl ester of 5,5-dimethyl-1,1-dicarboxyhexane, prepared as in Examples 3 and 4, and 21 grams of 4,4-dimethyl-1-bromopentane were added. The mixture was allowed to reflux for about two days. The ethyl alcohol was then distilled off, the mixture cooled to about 40° C., and the sodium bromide dissolved in warm water. The oil layer was then separated and fractionated, obtaining 27 grams of the ester, which boiled at 152° C. under 2 mm. pressure, and which had an index of refraction of about 1.4350 (with respect to the sodium-D line, at 20° C.).

The hydrolysis of the ester yielded a monobasic acid as above described in the form of white crystals, which melted at about 36° C. and which boiled at about 170° C. under 4 to 5 mm. pressure.

From the above, it will be seen that the several examples of acid falling within the type formula have been prepared. Other acids may likewise be prepared in the same manner.

In view of the above, it will be seen that the several objects of the invention are achieved and other advantageous results attained.

As many changes could be made in carrying out the above processes without departing from the scope of the invention, it is intended that all matter contained in the above description shall be interpreted as illustrative and not in a limiting sense.

We claim:
1. 5,5-dimethyl-1,1-dicarboxyhexane.
2. 2,2,10,10-tetramethyl-6-carboxyundecane.
3. An acid corresponding in composition to the type formula:

$$(CH_3)_3C-(CH_2)_n-CXY-COOH$$

where $n$ is equal to or greater than 2, X is hydrogen or an alkyl substituent, and Y is hydrogen or a carboxy substituent.

4. An acid corresponding in composition to the type formula:

$$(CH_3)_3C-(CH_2)_n-CHX-COOH$$

where $n$ is equal to or greater than 2, and X is hydrogen or an alkyl substituent.

FRANK C. WHITMORE.
AUGUST H. HOMEYER.
DAVID M. JONES.
WALTER R. TRENT.